United States Patent
Sun et al.

(10) Patent No.: US 11,589,410 B2
(45) Date of Patent: Feb. 21, 2023

(54) APPARATUSES AND METHODS FOR COORDINATING TRANSMISSION PATHS OF A MULTI-RADIO DUAL CONNECTIVITY (MR-DC) OPERATION

(71) Applicant: MediaTek Singapore Pte. Ltd., Singapore (SG)

(72) Inventors: Mengmeng Sun, Beijing (CN); Yanfei Ding, Beijing (CN); Ranxu Zhang, Beijing (CN); Yan Wu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 38 days.

(21) Appl. No.: 17/227,571

(22) Filed: Apr. 12, 2021

(65) Prior Publication Data
US 2022/0312527 A1    Sep. 29, 2022

(30) Foreign Application Priority Data
Mar. 23, 2021  (CN) .......................... 202110307149.4

(51) Int. Cl.
| | |
|---|---|
| *H04W 76/16* | (2018.01) |
| *H04W 76/19* | (2018.01) |
| *H04W 80/02* | (2009.01) |
| *H04W 84/18* | (2009.01) |

(52) U.S. Cl.
CPC .......... *H04W 76/16* (2018.02); *H04W 76/19* (2018.02); *H04W 80/02* (2013.01); *H04W 84/18* (2013.01)

(58) Field of Classification Search
CPC ..... H04W 76/16; H04W 76/19; H04W 80/02; H04W 84/18
See application file for complete search history.

(56) References Cited

U.S. PATENT DOCUMENTS

| | | | |
|---|---|---|---|
| 11,184,921 B2 | 11/2021 | Kim et al. | |
| 11,252,615 B2 | 2/2022 | Jin et al. | |
| 2020/0396701 A1* | 12/2020 | Yi | ........................ H04W 52/367 |
| 2021/0022032 A1* | 1/2021 | Kim | ........................ H04W 76/16 |
| 2022/0046738 A1* | 2/2022 | Challa | ................. H04W 56/001 |

(Continued)

FOREIGN PATENT DOCUMENTS

| | | |
|---|---|---|
| CN | 111602451 A | 8/2020 |
| EP | 3 478 019 A1 | 5/2019 |

(Continued)

OTHER PUBLICATIONS

Chinese language office action dated Feb. 11, 2022, issued in application No. TW 110126166.

*Primary Examiner* — Harry H Kim
(74) *Attorney, Agent, or Firm* — McClure, Qualey & Rodack, LLP

(57) ABSTRACT

A method executed by a User Equipment (UE) supporting Multi-Radio Dual Connectivity (MR-DC) with a first cell group and a second cell group in a mobile communication system is provided. The UE configures a primary path to the first cell group and a secondary path to the second cell group for uplink transmissions in an MR-DC operation. The UE determines whether the primary path is inapplicable when performing the uplink transmissions on the primary path. The UE switches from the primary path to the secondary path to continue the uplink transmissions in response to the primary path being inapplicable.

20 Claims, 8 Drawing Sheets

(56) References Cited

U.S. PATENT DOCUMENTS

| | | | |
|---|---|---|---|
| 2022/0104229 A1* | 3/2022 | Zacharias | H04W 24/04 |
| 2022/0110175 A1* | 4/2022 | Marupaduga | H04W 52/365 |
| 2022/0116852 A1* | 4/2022 | Chirala | H04W 52/48 |

FOREIGN PATENT DOCUMENTS

| | | |
|---|---|---|
| WO | 2018/228126 A1 | 12/2018 |
| WO | 2021/016856 A1 | 2/2021 |

* cited by examiner

APPARATUSES AND METHODS FOR COORDINATING TRANSMISSION PATHS OF A MULTI-RADIO DUAL CONNECTIVITY (MR-DC) OPERATION

CROSS REFERENCE TO RELATED APPLICATIONS

This application claims priority of China Patent Application No. 202110307149.4, filed on Mar. 23, 2021, the entirety of which is incorporated by reference herein.

BACKGROUND OF THE APPLICATION

Field of the Application

The application generally relates to mobile communications and, more particularly, to apparatuses and methods for coordinating transmission paths of a Multi-RAT (Radio Access Technology) Dual Connectivity (MR-DC) operation.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communication capability, may communicate voice and/or data signals to one or more mobile communication systems. The wireless communication between the UE and the mobile communication systems may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2nd Generation (2G) cellular technology; WCDMA/CDMA-2000/TD-SCDMA technology is also called 3rd Generation (3G) cellular technology; and LTE/LTE-A/TD-LTE technology is also called 4th Generation (4G) cellular technology.

These RATs have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the 3rd Generation Partnership Project (3GPP). It is designed to better support mobile broadband Internet access by improving spectral efficiency, reducing costs, and improving services.

In order to meet the demand for higher data rates in wireless communications, support for wider transmission bandwidths is required, and the so-called Multi-Radio Dual Connectivity (MR-DC) technique has been proposed to allow for the expansion of effective bandwidths delivered to a UE. Using the MR-DC technique, a UE may perform data transceiving simultaneously with two base stations, e.g., a macro base station (also called a Master Node (MN)) and a micro base station (also called a Secondary Node (SN)). The set of Serving cells (SCells) under control of the MN is defined as a Master Cell Group (MCG), while the set of SCells under control of the SN is defined as a Secondary Cell Group (SCG).

BRIEF SUMMARY OF THE APPLICATION

According to the 3GPP specifications in compliance with the 4G LTE and/or 5G NR technology, a UE supporting MR-DC is generally configured by network with a primary path and a secondary path for uplink transmissions, in which the primary path is configured to one of the MCG and the SCG, while the secondary path is configured to the other of the MCG and the SCG. In addition, the network further indicates an uplink split threshold to control the UE on distributing uplink data between the primary path and the second path. That being said, it is observed in some networks that the network indication of the uplink split threshold enforces the UE to always send uplink data on the primary path. As a result, the UE's uplink data throughput may be significantly affected if the primary path becomes inapplicable. For example, when an SCG failure or an MCG establishment occurs or the transmission delay on the primary path is too high, the uplink transmission on the primary path may be suspended or impacted, causing inapplicability of the primary path.

In order to solve the aforementioned problem, the present application proposes to allow the UE to disregard the network indication of always using the primary path and to leverage the secondary path for uplink transmission when the primary path is inapplicable.

In a first aspect of the application, a method, executed by a UE supporting MR-DC with a first cell group and a second cell group in a mobile communication system, is provided. The method comprises the following steps: configuring a primary path to the first cell group and a secondary path to the second cell group for uplink transmissions in an MR-DC operation; determining whether the primary path is inapplicable when performing the uplink transmissions on the primary path; and switching from the primary path to the secondary path to continue the uplink transmissions in response to the primary path being inapplicable.

In a first implementation form of the first aspect of the application, the first cell group and the second cell group are an SCG and an MCG, respectively.

In a second implementation form of the first aspect of the application in combination with the first implementation form of the first aspect of the application, the determining of whether the primary path is inapplicable comprises: determining whether a failure of the SCG is detected; and determining that the primary path is inapplicable in response to an SCG failure being detected.

In a third implementation form of the first aspect of the application in combination with the first implementation form of the first aspect of the application, the determining of whether the primary path is inapplicable comprises: determining whether a reestablishment of the MCG is detected; determining whether a reconfiguration message not comprising a RadioBearerConfig Information Element (IE) for indicating Packet Data Convergence Protocol (PDCP) to delete an original split configuration (e.g., primary path configuration and UL split threshold) is received in response to an MCG reestablishment being detected; and determining that the primary path is inapplicable in response to receiving the reconfiguration message not comprising the RadioBearerConfig IE for indicating PDCP to delete the original split configuration.

In a fourth implementation form of the first aspect of the application in combination with the first implementation form of the first aspect of the application, the MCG is formed by at least a 3rd Generation Partnership Project (3GPP) 4th Generation (4G) base station, while the SCG is formed by at least a 3GPP 5th Generation (5G) base station.

In a fifth implementation form of the first aspect of the application, the determining of whether the primary path is inapplicable comprises: determining a first transmission delay on the primary path; and determining that the primary path is inapplicable in response to the first transmission delay being greater than a first predetermined threshold.

In a sixth implementation form of the first aspect of the application in combination with the fifth implementation form of the first aspect of the application, the switching from the primary path to the secondary path for continuing the uplink transmissions is performed in response to a second transmission delay on the secondary path being less than the first predetermined threshold.

In a seventh implementation form of the first aspect of the application in combination with the sixth implementation form of the first aspect of the application, the method further comprises: switching from the secondary path back to the primary path to continue the uplink transmissions in response to second transmission delay being greater than the first transmission delay.

In an eighth implementation form of the first aspect of the application in combination with the fifth implementation form of the first aspect of the application, the method further comprises: performing the uplink transmissions on both the primary path and the secondary path in response to the first transmission delay being less than the first predetermined threshold and greater than a second predetermined threshold which is less than the first predetermined threshold.

In a ninth implementation form of the first aspect of the application in combination with the eighth implementation form of the first aspect of the application, the performing of the uplink transmissions on both the primary path and the secondary path comprises: distributing uplink data between the primary path and the secondary path according to uplink grants reported by each Medium Access Control (MAC) entity.

In a second aspect of the application, a UE, supporting MR-DC with a first cell group and a second cell group in a mobile communication system, is provided. The UE comprises a first Radio Frequency (RF) device, a second RF device, and a controller. The first RF device is configured to perform wireless transceiving to and from the first cell group. The second RF device is configured to perform wireless transceiving to and from the second cell group. The controller is configured to configure a primary path to the first cell group and a secondary path to the second cell group for uplink transmissions in an MR-DC operation, determine whether the primary path is inapplicable when performing the uplink transmissions on the primary path via the first RF device, and switch from the primary path to the secondary path to continue the uplink transmissions via the second RF device in response to the primary path being inapplicable.

In a first implementation form of the second aspect of the application, the first cell group and the second cell group are an SCG and an MCG, respectively.

In a second implementation form of the second aspect of the application in combination with the first implementation form of the second aspect of the application, the determining of whether the primary path is inapplicable comprises: determining whether a failure of the SCG is detected; and determining that the primary path is inapplicable in response to an SCG failure being detected.

In a third implementation form of the second aspect of the application in combination with the first implementation form of the second aspect of the application, the determining of whether the primary path is inapplicable comprises: determining whether a reestablishment of the MCG is detected; determining whether a reconfiguration message not comprising a RadioBearerConfig IE for indicating PDCP to delete an original split configuration (e.g., primary path configuration and UL split threshold) is received in response to an MCG reestablishment being detected; and determining that the primary path is inapplicable in response to receiving the reconfiguration message not comprising the RadioBearerConfig IE for indicating PDCP to delete the original split configuration.

In a fourth implementation form of the second aspect of the application in combination with the first implementation form of the second aspect of the application, the MCG is formed by at least a 3GPP 4G base station, while the SCG is formed by at least a 3GPP 5G base station.

In a fifth implementation form of the second aspect of the application, the determining of whether the primary path is inapplicable comprises: determining a first transmission delay on the primary path; and determining that the primary path is inapplicable in response to the first transmission delay being greater than a first predetermined threshold.

In a sixth implementation form of the second aspect of the application in combination with the fifth implementation form of the second aspect of the application, the switching from the primary path to the secondary path to continue the uplink transmissions is performed in response to a second transmission delay on the secondary path being less than the first predetermined threshold.

In a seventh implementation form of the second aspect of the application in combination with the sixth implementation form of the second aspect of the application, the controller is further configured to switch from the secondary path back to the primary path for continuing the uplink transmissions in response to second transmission delay being greater than the first transmission delay.

In an eighth implementation form of the second aspect of the application in combination with the fifth implementation form of the second aspect of the application, the controller is further configured to perform the uplink transmissions on both the primary path and the secondary path via the first RF device and the second RF device in response to the first transmission delay being less than the first predetermined threshold and greater than a second predetermined threshold which is less than the first predetermined threshold.

In a ninth implementation form of the second aspect of the application in combination with the eighth implementation form of the second aspect of the application, the performing of the uplink transmissions on both the primary path and the secondary path comprises: distributing uplink data between the primary path and the secondary path according to uplink grants reported by each MAC entity.

Other aspects and features of the present application will become apparent to those with ordinarily skill in the art upon review of the following descriptions of specific embodiments of the apparatuses and the methods for coordinating transmission paths of an MR-DC operation.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
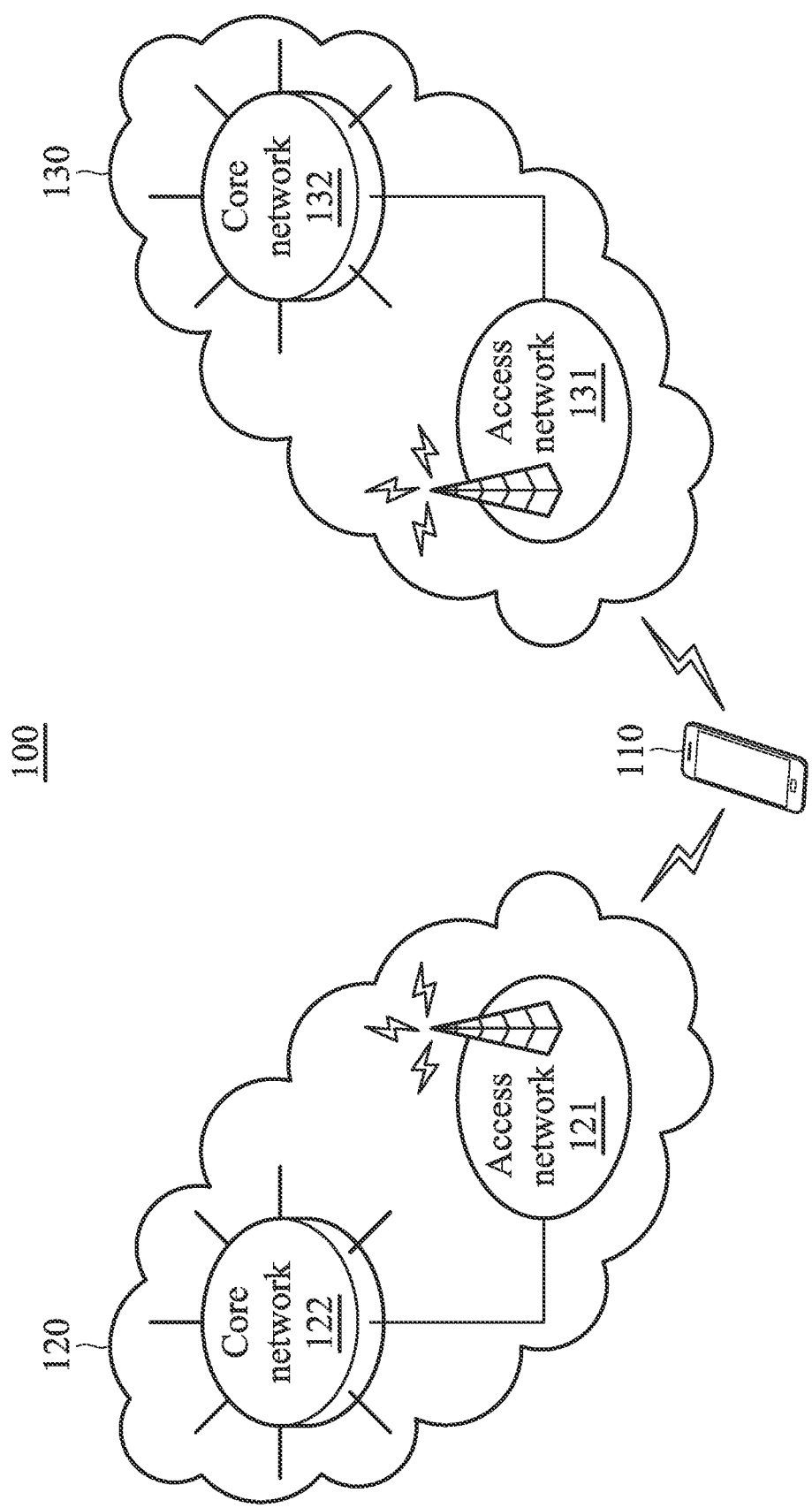
FIG. 1 is a block diagram of a mobile communication system according to an embodiment of the application.

FIG. 1 is a block diagram of a mobile communication system according to an embodiment of the application.

As shown in FIG. 1, the mobile communication system 100 may include a User Equipment (UE) 110 and two service networks 120 and 130.

The UE 110 may be a feature phone, a smartphone, a panel Personal Computer (PC), a laptop computer, or any wireless communication device supporting Multi-Radio Dual Connectivity (MR-DC). That is, the UE 110 supports the RATs utilized by the service networks 120 and 130, and may perform wireless transmission and/or reception to and/or from both the service networks 120 and 130 simultaneously. Examples of MR-DC configuration may include EN-DC (E-UTRA-NR Dual Connectivity), NR-DC (New Radio Dual Connectivity), NGEN-DC (NG-RAN-E-UTRA Dual Connectivity) and NE-DC (NR-E-UTRA Dual Connectivity).

The service network 120 may include an access network 121 and a core network 122, while the service network 130 may include an access network 131 and a core network 132.

The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet). The access networks 121 and 131, and the core networks 122 and 132 may each include one or more network nodes for carrying out said functions. For example, in an MR-DC operation, one of the access networks 121 and 131 may include at least a base station serving as a Master Node (MN), and the other of the access networks 121 and 131 may include at least a base station serving as a Secondary Node (SN).

In one embodiment, the service networks 120 and 130 may utilize different RATs. For example, in EN-DC/NE-DC/NGEN-DC, one of the service networks 120 and 130 may be a 5G System (5GS) utilizing the NR technology, and the other of the service networks 120 and 130 may be an Evolved Packet System (EPS) utilizing the LTE/LTE-A/TD-LTE technology.

In another embodiment, the service networks 120 and 130 may utilize the same RAT. For example, in NR-DC, each of the service networks 120 and 130 may be a 5GS.

If the service network 120/130 is a 5GS, the access network 121/131 may be a Next Generation Radio Access Network (NG-RAN) and the core network 122/132 may be a Next Generation Core Network (NG-CN).

An NG-RAN may include one or more Base Stations (BSs), such as next generation NodeBs (gNBs), which support high frequency bands (e.g., above 24 GHz), and each gNB may further include one or more Transmission Reception Points (TRPs). Each gNB or TRP may be referred to as a 5G base station and may be configured as an MN or SN. A 5G base station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells.

In particularly, if a gNB is configured as the MN of an MR-DC operation, the group of cells formed by the gNB may be referred to as the Master Cell Group (MCG). Alternatively, if a gNB is configured as the SN of an MR-DC operation, the group of cells formed by the gNB may be referred to as the Secondary Cell Group (SCG).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

If the service network 120/130 is an EPS, the access network 121/131 may be an Evolved-Universal Terrestrial Radio Access Network (E-UTRAN) and the core network 122/132 may be an Evolved Packet Core (EPC).

An E-UTRAN may include at least an evolved NodeB (eNB) (e.g., a macro eNB, femto eNB, or pico eNB). Each eNB may be referred to as a 4G base station and may be configured as an MN or SN. A 4G base station may form one or more cells with different CCs for providing mobile services to the UE 110. For example, the UE 110 may camp on one or more cells formed by one or more eNBs, wherein the cells which the UE 110 is camped on may be referred to as serving cells.

In particularly, if an eNB is configured as the MN of an MR-DC operation, the group of cells formed by the eNB may be referred to as the MCG. Alternatively, if an eNB is configured as the SN of an MR-DC operation, the group of cells formed by the eNB may be referred to as the SCG.

An EPC generally consists of a Home Subscriber Server (HSS), Mobility Management Entity (MME), Serving Gateway (S-GW), and Packet Data Network Gateway (PDN-GW or P-GW). The HSS is a central database that contains user-related and subscription-related information. The functions of the HSS include functionalities such as mobility management, call and session establishment support, user authentication and access authorization. The MME is responsible for managing sessions, authentication, paging, mobility, bearers and roaming. The S-GW is responsible for routing and forwarding user data packets, while also acting as the mobility anchor for the user plane during inter-eNB handovers and as the anchor for mobility between LTE and other 3GPP technologies. The P-GW provides connectivity from the UE 110 to external PDNs by being the point of exit and entry of traffic for the UE 110. The PGW also provides the functions of policy enforcement, packet filtering for each user, charging support, lawful interception, and packet screening.

It should be understood that the mobile communication system 100 described in the embodiment of FIG. 1 is for illustrative purposes only and is not intended to limit the scope of the application. For example, the service network 120 or 130 may be a 6G network or any network that supports MR-DC with one another.

Figure 2:
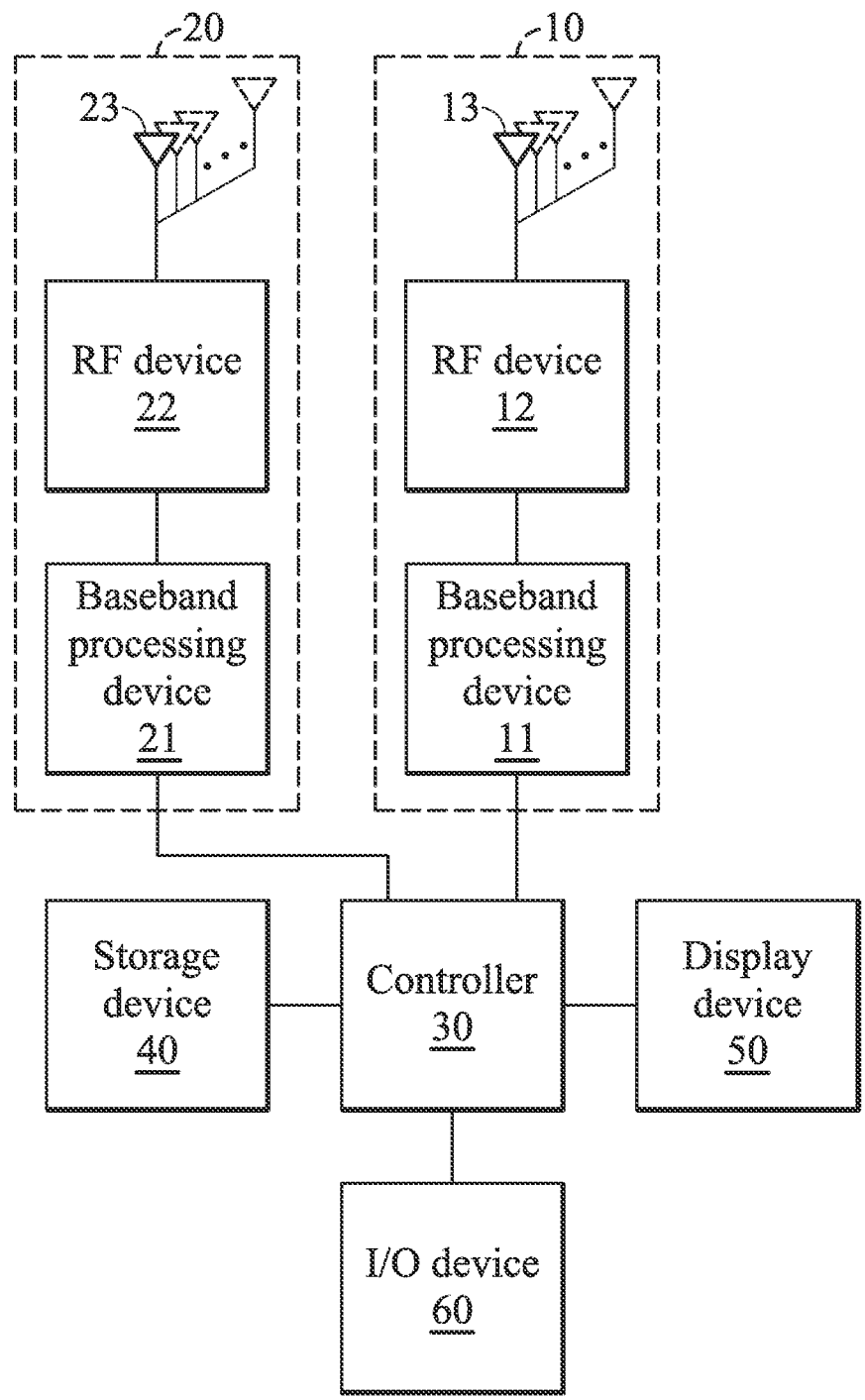
FIG. 2 is a block diagram illustrating a UE according to an embodiment of the application.

FIG. 2 is a block diagram illustrating a UE according to an embodiment of the application.

As shown in FIG. 2, a UE may include two wireless transceivers 10 and 20, a controller 30, a storage device 40, a display device 50, and an Input/Output (I/O) device 60.

The wireless transceiver 10 is configured to perform wireless transceiving to and from one of the service networks 120 and 130.

Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components, such as a baseband processor, to perform the baseband signal processing, such as Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 2100 MHz, or 2.6 GHz utilized in LTE/LTE-A/TD-LTE systems, or any radio frequency (e.g., sub-6 GHz, 24.25 GHz-52.6 GHz for mmWave) utilized in 5G (e.g., NR) systems, or another radio frequency, depending on the RAT in use.

The wireless transceiver 20 is configured to perform wireless transceiving to and from the other of the service networks 120 and 130.

Specifically, the wireless transceiver 20 may include a baseband processing device 21, an RF device 22, and an antenna 23, wherein the antenna 23 may include an antenna array for beamforming.

The baseband processing device 21 is configured to perform baseband signal processing. The baseband processing device 21 may contain multiple hardware components, such as a baseband processor, to perform the baseband signal processing, such as ADC/DAC, gain adjusting, modulation/demodulation, encoding/decoding, and so on.

The RF device 22 may receive RF wireless signals via the antenna 23, convert the received RF wireless signals to baseband signals, which are processed by the baseband processing device 21, or receive baseband signals from the baseband processing device 21 and convert the received baseband signals to RF wireless signals, which are later transmitted via the antenna 23. The RF device 22 may also contain multiple hardware devices to perform radio frequency conversion. For example, the RF device 22 may include a mixer to multiply the baseband signals with a carrier oscillated in the radio frequency of the supported non-cellular technologies, wherein the radio frequency may be 900 MHz, 2100 MHz, or 2.6 GHz utilized in LTE/LTE-A/TD-LTE systems, or any radio frequency (e.g., sub-6 GHz, 24.25 GHz-52.6 GHz for mmWave) utilized in 5G (e.g., NR) systems, or another radio frequency, depending on the RAT in use.

In another embodiment, the wireless transceivers 10 and 20 may be incorporated into a single chip. That is, the single chip may include a combo RF device to support wireless transceiving to and from both the service networks 120 and 130.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data (including video data and other types of data) processing and computing, controlling the wireless transceivers 10 and 20 for wireless communications with the service networks 120 and 130, storing and retrieving data (e.g., program code) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the method of the present application.

In another embodiment, the controller 30 may be incorporated into the baseband processing device 11 or the baseband processing device 21, to serve as a baseband processor.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the UE may include more components, such as a Global Positioning System (GPS) device for use of some location-based services or applications, and/or a battery for powering the other components of the UE, etc. Alternatively, the UE may include fewer components. For example, the UE may not include the display device 50 and/or the I/O device 60.

Figure 3:
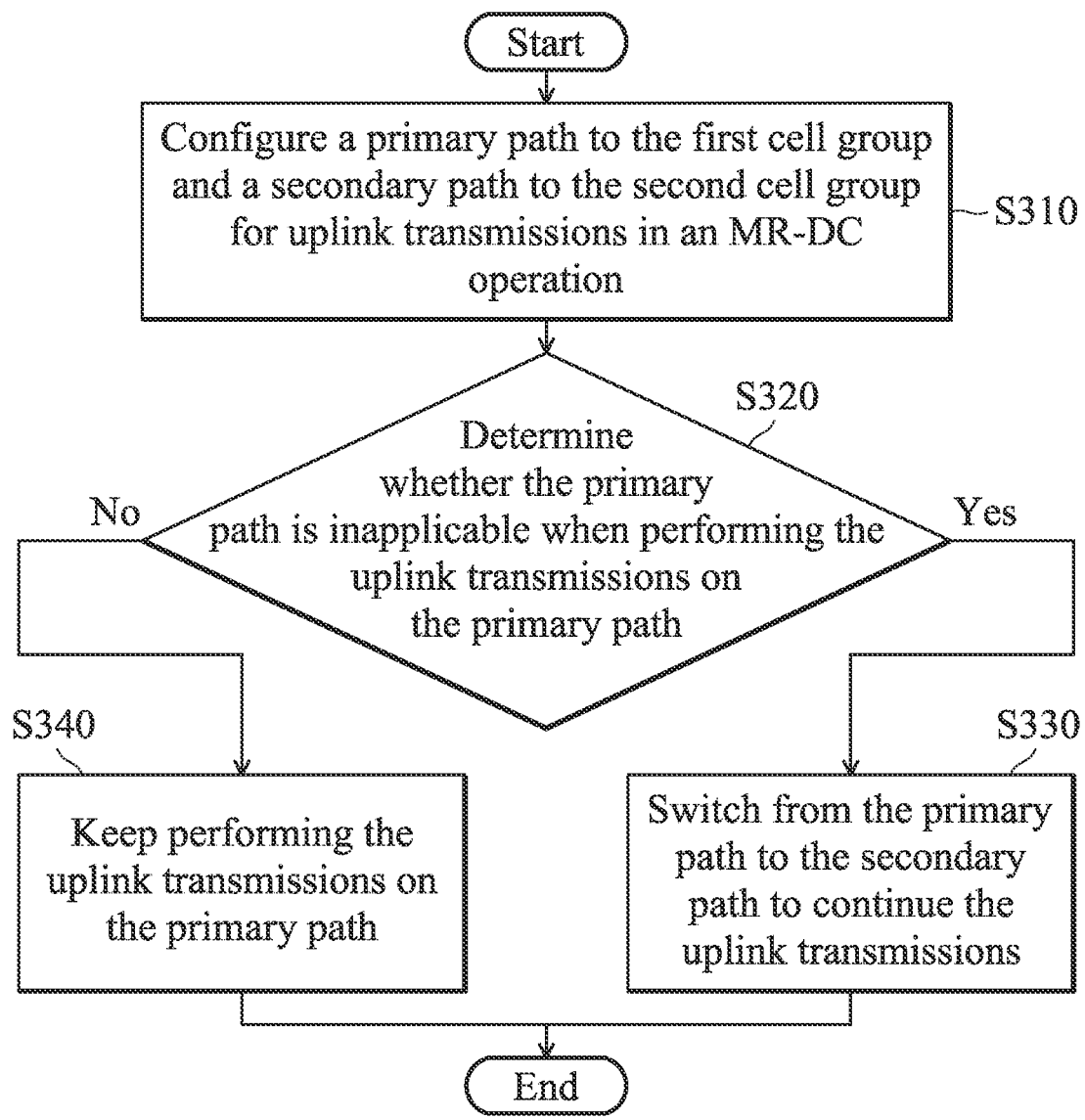
FIG. 3 is a flow chart illustrating the method for coordinating transmission paths of an MR-DC operation according to an embodiment of the application.

FIG. 3 is a flow chart illustrating the method for coordinating transmission paths of an MR-DC operation according to an embodiment of the application.

In this embodiment, the method for coordinating transmission paths of an MR-DC operation may be applied to and executed by a UE (e.g., the UE 110) supporting MR-DC with a first cell group (e.g., an MCG) and a second cell group (e.g., an SCG) in a mobile communication system (e.g., the mobile communication system 100).

In step S310, the UE configures a primary path to the first cell group and a secondary path to the second cell group for uplink transmissions in an MR-DC operation.

In one embodiment, the first cell group and the second cell group may be an SCG and an MCG, respectively. For example, the MCG may be formed by at least a 3GPP 4G base station (e.g., an eNB), while the SCG is formed by at least a 3GPP 5G base station (e.g., a gNB).

To further clarify, the configuration of the primary path and the secondary path may be based on the uplink (UL) split parameters received from the mobile communication system. For example, the UE may receive a Radio Resource Control (RRC) Connection Reconfiguration message from an 4G LTE network, or an RRC Reconfiguration message from a 5G NR network, wherein the RRC Connection Reconfiguration message or the RRC Reconfiguration message may include the UL split parameters for the UE. Specifically, the UL split parameters may indicate the primary path with a cell group ID or Logical Channel ID (LCID) corresponding to the Radio Link Control (RLC) entity associated with either the first cell group or the second cell group, and indicate the UL split threshold. That is, as long as the primary path is configured to one cell group, the secondary path is automatically configured to the other cell group by default.

Please note that, a conventional UE should send uplink data on the primary path if the amount of data buffered for transmission is less than the UL split threshold, and distribute uplink data between the primary path and the secondary path only if the amount of data buffered for transmission on the primary path is greater than or equal to the UL split threshold. Disadvantageously, the conventional UE will be limited to perform uplink transmission only on the primary path in the cases where uplink data volume is less than the UL split threshold, regardless of whether the primary path condition is good or bad. Unlike the conventional design, the method in the present application proceeds with the following steps.

In step S320, the UE determines whether the primary path is inapplicable when performing the uplink transmissions on the primary path.

In one embodiment, the determination of whether the primary path is inapplicable may refer to: determining whether a failure of the SCG is detected, and determining that the primary path is inapplicable in response to an SCG failure being detected.

In another embodiment, the determination of whether the primary path is inapplicable may refer to: determining whether a reestablishment of the MCG is detected, determining whether a reconfiguration message not comprising a RadioBearerConfig Information Element (IE) for indicating Packet Data Convergence Protocol (PDCP) to delete an original split configuration (e.g., primary path configuration and UL split threshold) is received in response to an MCG reestablishment being detected, and determining that the primary path is inapplicable in response to receiving the reconfiguration message not comprising the RadioBearerConfig IE for indicating PDCP to delete the original split configuration.

In yet another embodiment, the determination of whether the primary path is inapplicable may refer to: determining a first transmission delay on the primary path, and determining that the primary path is inapplicable in response to the first transmission delay being greater than a first predetermined threshold.

In step S330, the UE switches from the primary path to the secondary path to continue the uplink transmissions in response to the primary path being inapplicable.

In step S340, the UE keeps performing the uplink transmissions on the primary path in response to the primary path not being inapplicable.

Figure 4:
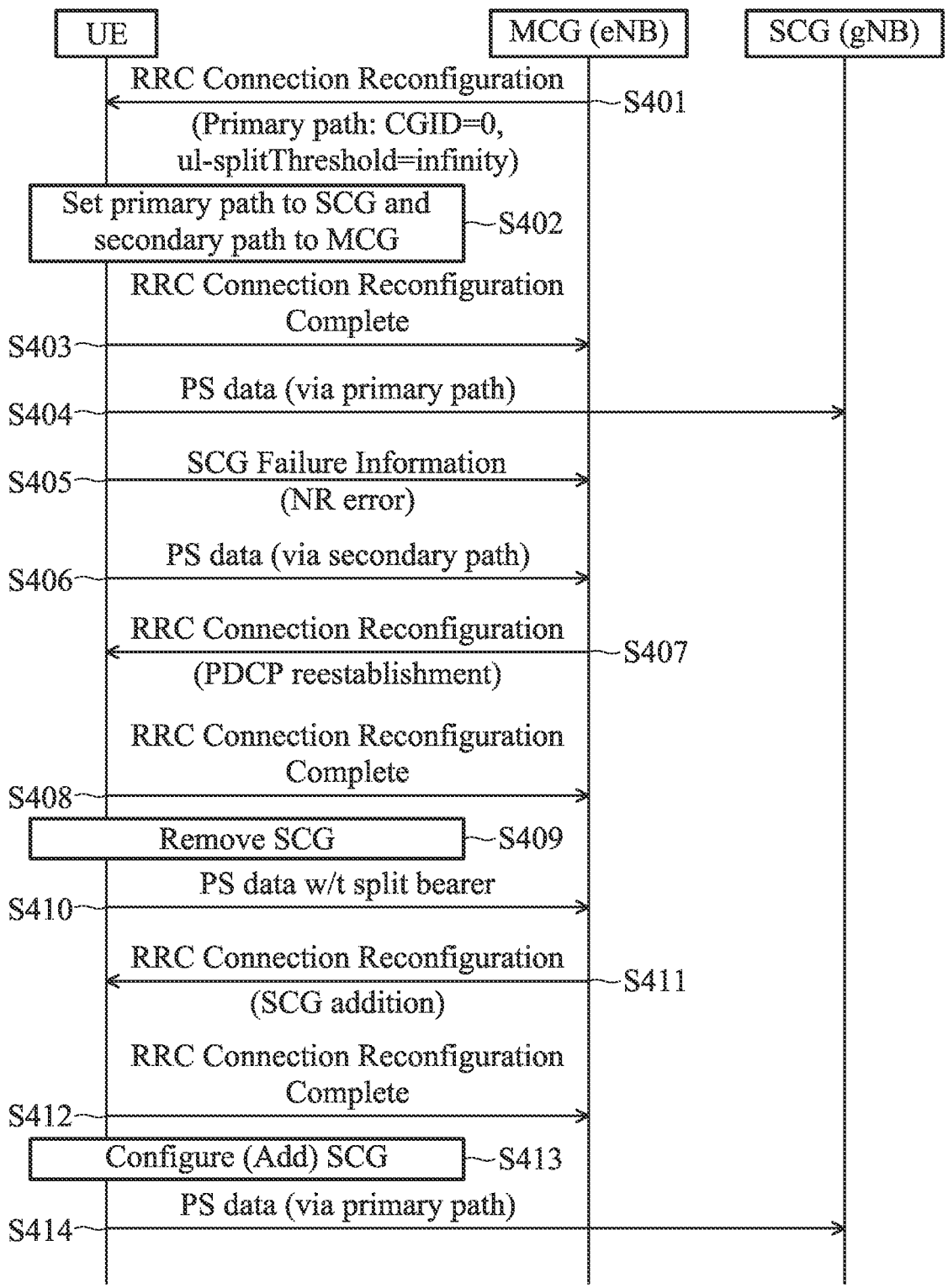
FIG. 4 is a message sequence chart illustrating the coordination of transmission paths for an SCG failure during an MR-DC operation according to an embodiment of the application.

FIG. 4 is a message sequence chart illustrating the coordination of transmission paths for an SCG failure during an MR-DC operation according to an embodiment of the application.

In this embodiment, the MR-DC configuration is exemplified as EN-DC, in which the MCG is formed by an eNB and the SCG is formed by a gNB, but the application should not be limited thereto.

In step S401, the UE receives an RRC Connection Reconfiguration message from the MCG, which indicates the primary path with a CGID=0 (i.e., the cell group ID of the SCG) and an UL split threshold=infinity.

In step S402, the UE configures the primary path to the SCG and the secondary path to the MCG based on the CGID=0.

In step S403, the UE replies to the MCG with an RRC Connection Reconfiguration Complete message.

In step S404, the UE performs uplink transmissions on the primary path.

In step S405, the UE detects an SCG failure and sends an SCG Failure Information message to the MCG.

In step S406, the UE switches the transmission path from the primary path to the secondary path, and performs uplink transmissions on the secondary path.

In step S407, the UE receives an RRC Connection Reconfiguration message from the MCG, which includes information for PDCP reestablishment.

In step S408, the UE replies to the MCG with an RRC Connection Reconfiguration Complete message.

In step S409, the UE removes the SCG configuration in response to the PDCP reestablishment. That is, the UE exits the MR-DC operation and no split bearer is in use.

In step S410, the UE performs uplink transmissions to the MCG without split bearer.

In step S411, the UE receives an RRC Connection Reconfiguration message from the MCG, which includes information for adding the SCG.

In step S412, the UE replies to the MCG with an RRC Connection Reconfiguration Complete message.

In step S413, the UE configures the SCG according to the SCG addition information.

In step S414, the UE switches the transmission path from the secondary path back to the primary path, and performs uplink transmissions on the primary path.

In view of the forgoing embodiment of FIG. 4, it will be appreciated that the uplink transmissions may continue during the period of time from the occurrence of the SCG failure to the completion of the PDCP reestablishment, by switching the transmission path from the primary path to the secondary path. Advantageously, interruption or suspension of the uplink transmissions may be reduced or avoided, and the UE's uplink data throughput may be improved.

Figure 5:
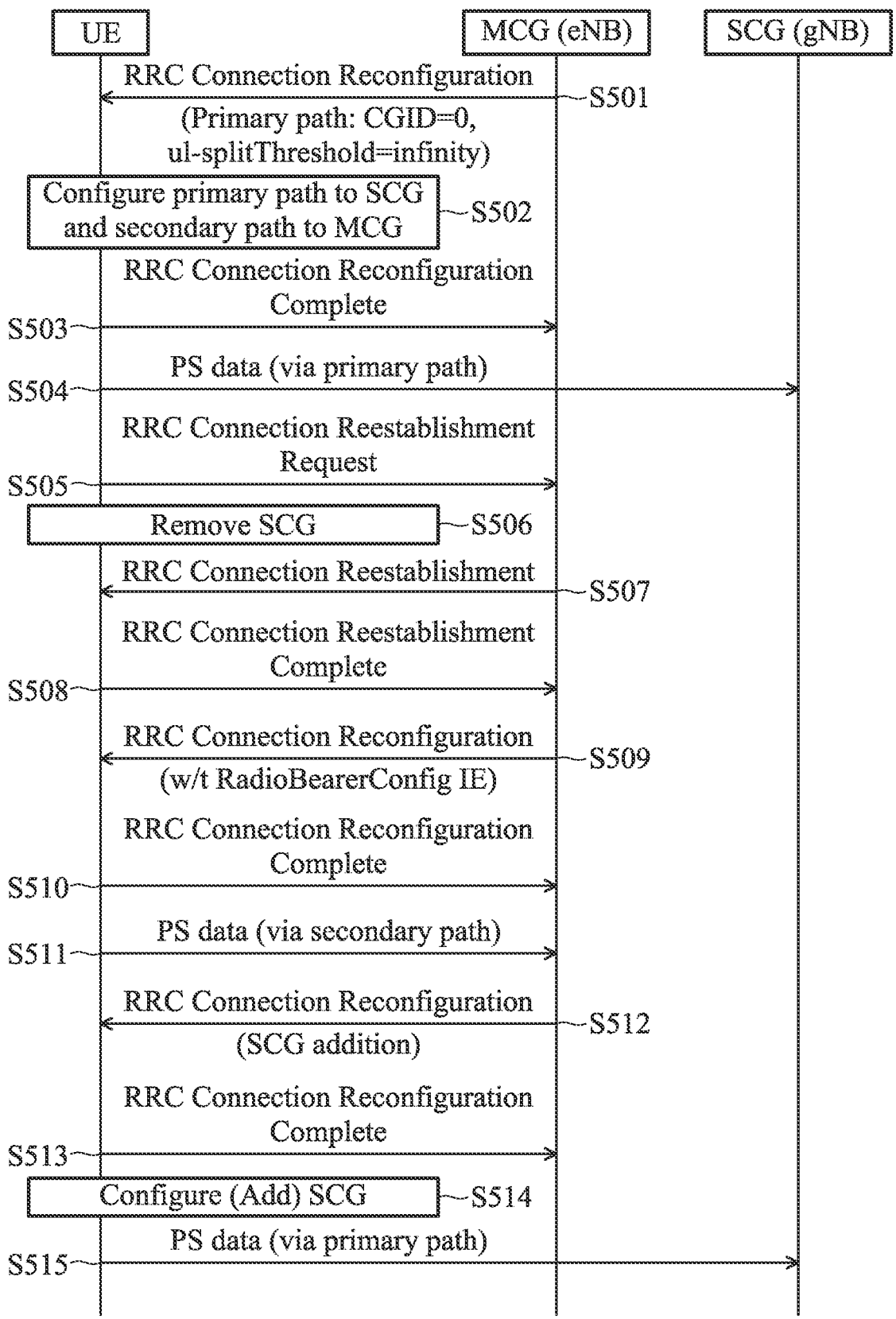
FIG. 5 is a message sequence chart illustrating the coordination of transmission paths for an MCG reestablishment during an MR-DC operation according to an embodiment of the application.

FIG. 5 is a message sequence chart illustrating the coordination of transmission paths for an MCG reestablishment during an MR-DC operation according to an embodiment of the application.

In this embodiment, the MR-DC configuration is exemplified as EN-DC, in which the MCG is formed by an eNB and the SCG is formed by a gNB, but the application should not be limited thereto.

In step S501, the UE receives an RRC Connection Reconfiguration message from the MCG, which indicates the primary path with a CGID=0 (i.e., the cell group ID of the SCG) and an UL split threshold=infinity.

In step S502, the UE configures the primary path to the SCG and the secondary path to the MCG based on the CGID=0.

In step S503, the UE replies to the MCG with an RRC Connection Reconfiguration Complete message.

In step S504, the UE performs uplink transmissions on the primary path.

In step S505, the UE detects a Radio Link Failure (RLF) on the MCG (i.e., detects an MCG reestablishment) and sends an RRC Connection Reestablishment Request message to the MCG for MCG reestablishment.

In step S506, the UE removes the SCG configuration in response to the MCG reestablishment. That is, the UE exits the MR-DC operation and no split bearer is in use.

In step S507, the UE receives an RRC Connection Reestablishment message from the MCG.

In step S508, the UE replies to the MCG with an RRC Connection Reestablishment Complete message.

In step S509, the UE receives an RRC Connection Reconfiguration message from the MCG, which does not include a RadioBearerConfig IE for indicating PDCP to delete the original split configuration (e.g., primary path configuration and UL split threshold). That is, without the RadioBearerConfig IE, the original split configuration will still be in use (i.e., the primary path is still the SCG) by a conventional UE.

In step S510, the UE replies to the MCG with an RRC Connection Reconfiguration Complete message.

In step S511, the UE switches the transmission path from the primary path to the secondary path, and performs uplink transmissions on the secondary path.

In step S512, the UE receives an RRC Connection Reconfiguration message from the MCG, which includes information for adding the SCG.

In step S513, the UE replies to the MCG with an RRC Connection Reconfiguration Complete message.

In step S514, the UE configures the SCG according to the SCG addition information.

In step S515, the UE switches the transmission path from the secondary path back to the primary path, and performs uplink transmissions on the primary path.

In view of the forgoing embodiment of FIG. 5, it will be appreciated that the uplink transmissions may continue during the period of time from the reception of an RRC Connection Reconfiguration message without a RadioBearerConfig IE for PDCP configuration to the reception of an RRC Connection Reconfiguration message with a RadioBearerConfig IE for PDCP configuration (e.g., SCG addition), by allowing the UE to switch the transmission path from the primary path to the secondary path in response to receiving an RRC Connection Reconfiguration message without a RadioBearerConfig IE. Advantageously, interruption or suspension of the uplink transmissions may be reduced or avoided, and the UE's uplink data throughput may be improved.

Figure 6:
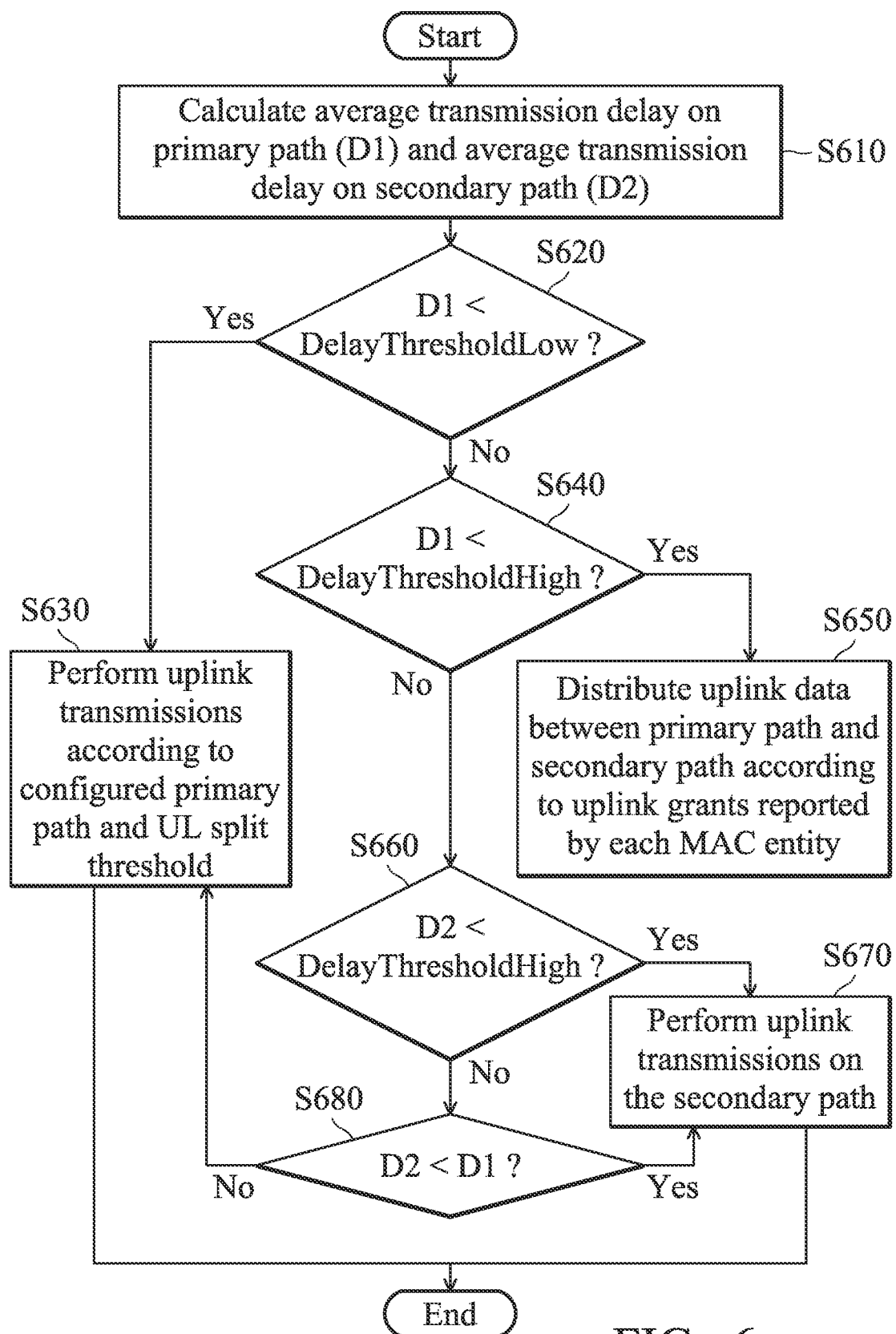
FIG. 6 is a flow chart illustrating the method for transmission delay-based coordination of transmission paths for MR-DC according to another embodiment of the application.

FIG. 6 is a flow chart illustrating the method for transmission delay-based coordination of transmission paths for MR-DC according to another embodiment of the application.

In this embodiment, the method may be applied to and executed by a UE (e.g., the UE 110) supporting MR-DC with the primary path configured to a first cell group (e.g., an MCG) and the secondary path to a second cell group (e.g., an SCG) for uplink transmissions. In particular, two predetermined thresholds for transmission delay are used, including a first predetermined threshold (referred to herein as DelayThresholdHigh) and a second predetermined threshold (referred to herein as DelayThresholdLow), to evaluate the applicability of the transmission paths for MR-DC. It is assumed that DelayThresholdHigh is greater than DelayThresholdLow.

In step S610, the UE calculates the average transmission delay on the primary path (referred to herein as D1) and the average transmission delay on the secondary path (referred to herein as D2). Specifically, the average transmission delay may refer to the average time duration from the transmission time of uplink data to the reception time of the RLC Acknowledgement (Ack) for the uplink data. For example, a long transmission delay may indicate inapplicability (e.g., poor quality indicated by small uplink grant or high Block Error Rate (BLER)) of a transmission path, which causes degraded uplink data throughput.

In step S620, the UE determines whether D1 is less than DelayThresholdLow.

Subsequent to step S620, if D1 is less than DelayThresholdLow, the method proceeds to step S630 in which the UE performs uplink transmissions according to the configured primary path and the configured UL split threshold.

Subsequent to step S620, if D1 is greater than or equal to DelayThresholdLow, the method proceeds to step S640 in which the UE determines whether D1 is less than DelayThresholdHigh.

Subsequent to step S640, if D1 is less than DelayThresholdHigh, the method proceeds to step S650 in which the UE distributes uplink data between the primary path and the secondary path according to uplink grants reported by each Medium Access Control (MAC) entity.

Subsequent to step S640, if D1 is greater than or equal to DelayThresholdHigh, the method proceeds to step S660 in which the UE determines whether D2 is less than DelayThresholdHigh.

Subsequent to step S660, if D2 is less than DelayThresholdHigh, the method proceeds to step S670 in which the UE performs uplink transmissions on the secondary path.

Subsequent to step S660, if D2 is not less than DelayThresholdHigh, the method proceeds to step S680 in which the UE determines whether D2 is less than D1.

Subsequent to step S680, if D2 is less than D1, the method proceeds to step S670. Otherwise, if D2 is not less than D1, the method proceeds to step S630.

In another embodiment, the method may repeat in a recursive manner. That is, after steps S630 and S670, the method may return to the start.

Figure 7:
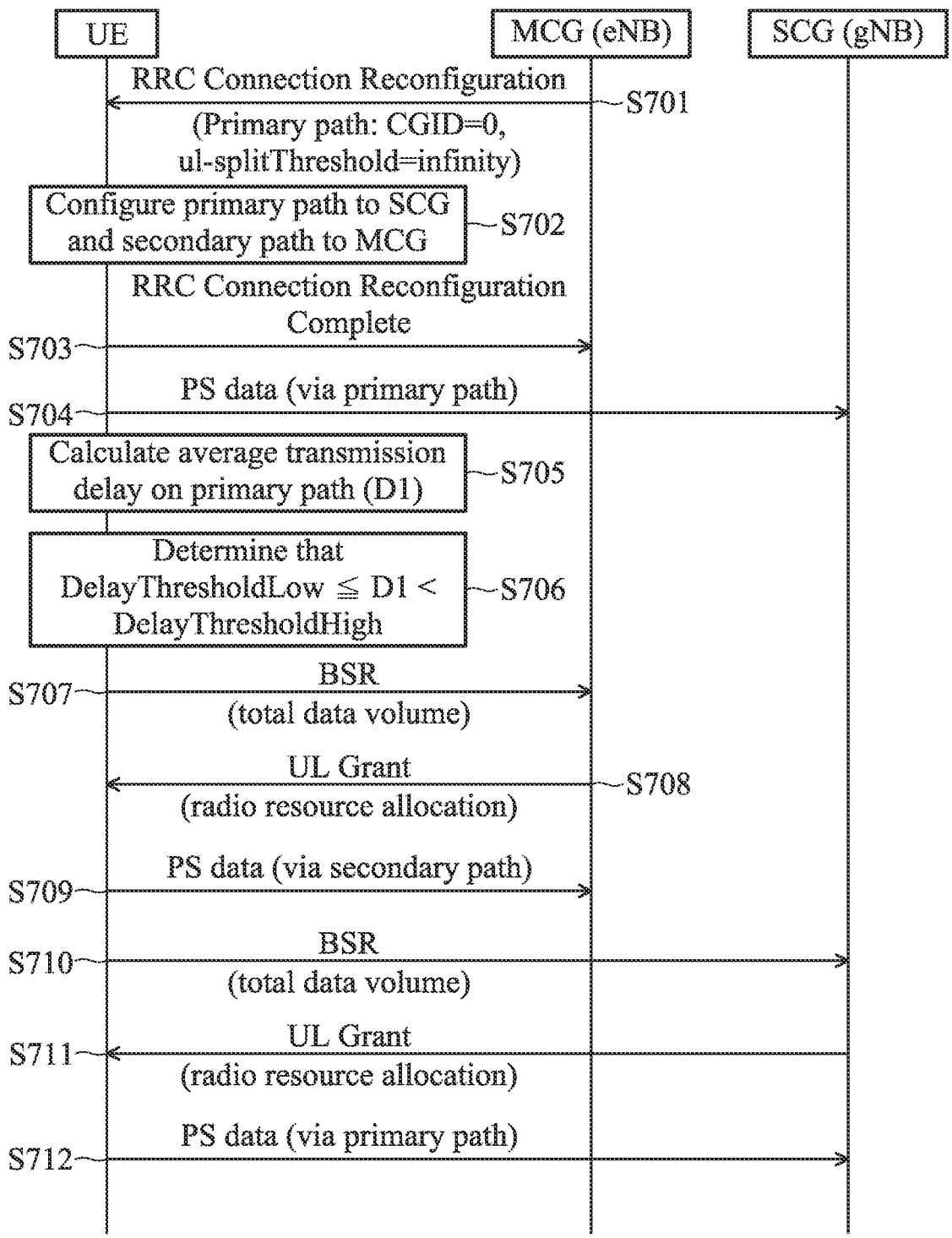
FIG. 7 is a message sequence chart illustrating transmission delay-based coordination of transmission paths for MR-DC according to an embodiment of the application.

FIG. 7 is a message sequence chart illustrating transmission delay-based coordination of transmission paths for MR-DC according to an embodiment of the application.

In this embodiment, the MR-DC configuration is exemplified as EN-DC, in which the MCG is formed by an eNB and the SCG is formed by a gNB, but the application should not be limited thereto.

In step S701, the UE receives an RRC Connection Reconfiguration message from the MCG, which indicates the primary path with a CGID=0 (i.e., the cell group ID of the SCG) and an UL split threshold=infinity.

In step S702, the UE configures the primary path to the SCG and the secondary path to the MCG based on the CGID=0.

In step S703, the UE replies to the MCG with an RRC Connection Reconfiguration Complete message.

In step S704, the UE performs uplink transmissions on the primary path.

In step S705, the UE calculates the average transmission delay on the primary path.

In step S706, the UE determines that the average transmission delay on the primary path is greater than or equal to DelayThresholdLow and less than DelayThresholdHigh, and in response, the UE may distribute uplink data between the primary path and the secondary path as follows.

In step S707, the UE sends a Buffer Status Report (BSR) to the MCG to report the volume of buffered data to be transmitted.

In step S708, the UE receives an uplink grant from the MCG, which indicates the radio resource allocation for uplink transmissions on the secondary path.

In step S709, the UE performs uplink transmission on the secondary path according to the indicated radio resource allocation.

In step S710, the UE sends a BSR to the SCG to report the amount of buffered data to be transmitted.

In step S711, the UE receives an UL Grant from the SCG, which indicates the radio resource allocation for uplink transmissions on the primary path.

In step S712, the UE performs uplink transmission on the primary path according to the indicated radio resource allocation.

Figure 8:
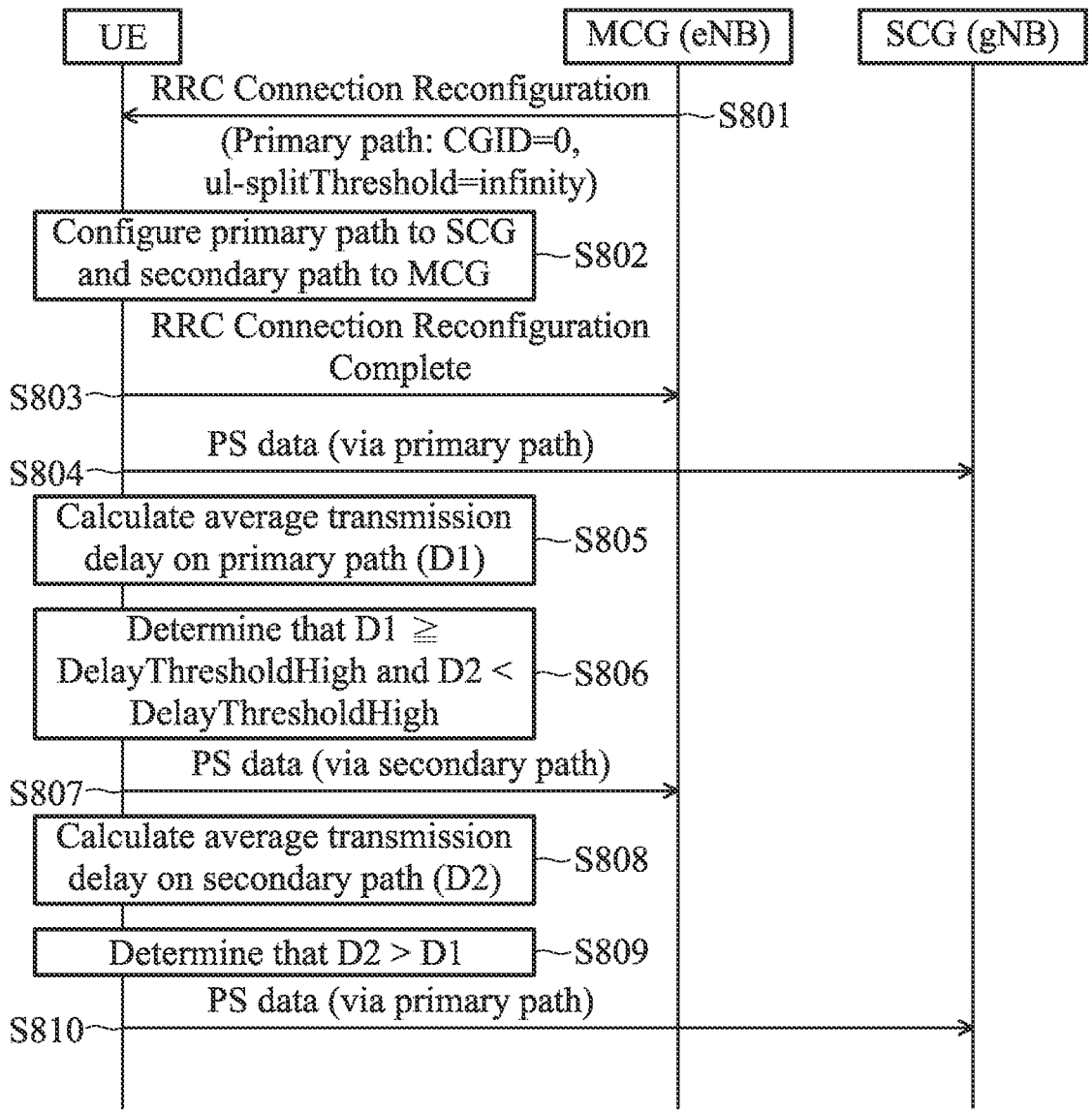
FIG. 8 is a message sequence chart illustrating transmission delay-based coordination of transmission paths for MR-DC according to another embodiment of the application.

FIG. 8 is a message sequence chart illustrating transmission delay-based coordination of transmission paths for MR-DC according to another embodiment of the application.

In this embodiment, the MR-DC configuration is exemplified as EN-DC, in which the MCG is formed by an eNB and the SCG is formed by a gNB, but the application should not be limited thereto.

In step S801, the UE receives an RRC Connection Reconfiguration message from the MCG, which indicates the primary path with a CGID=0 (i.e., the cell group ID of the SCG) and an UL split threshold=infinity.

In step S802, the UE configures the primary path to the SCG and the secondary path to the MCG based on the CGID=0.

In step S803, the UE replies to the MCG with an RRC Connection Reconfiguration Complete message.

In step S804, the UE performs uplink transmissions on the primary path.

In step S805, the UE calculates the average transmission delay on the primary path.

In step S806, the UE determines that the average transmission delay on the primary path is greater than or equal to DelayThresholdHigh and the average transmission delay on the secondary path is less than DelayThresholdHigh. Note that the average transmission delay on the secondary path is initialized to 0 before any uplink transmissions take place on the secondary path.

In step S807, the UE switches the transmission path from the primary path to the secondary path, and performs uplink transmission on the secondary path.

In step S808, the UE calculates the average transmission delay on the secondary path.

In step S809, the UE determines that the average transmission delay on the secondary path is greater than the average transmission delay on the primary path.

In step S810, the UE switches the transmission path from the secondary path back to the primary path, and performs uplink transmission on the primary path.

In view of the forgoing embodiments of FIGS. 7-8, it will be appreciated that interruption or suspension of the uplink transmissions in an MR-DC operation may be reduced or avoided, by allowing the UE to dynamically switch between the primary path and the secondary path based on the average transmission delays. Advantageously, the UE's uplink data throughput may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, executed by a User Equipment (UE) supporting Multi-Radio Dual Connectivity (MR-DC) with a first cell group and a second cell group in a mobile communication system, the method comprising:
configuring a primary path to the first cell group and a secondary path to the second cell group for uplink transmissions in an MR-DC operation;
determining an amount of uplink data being less than an uplink split threshold indicated by the mobile communication system;
determining whether the primary path is inapplicable when performing the uplink transmissions on the primary path; and
switching from the primary path to the secondary path to continue the uplink transmissions in response to the primary path being inapplicable, to avoid the UE always sending uplink data on the primary path.

2. The method as claimed in claim 1, wherein the first cell group and the second cell group are a Secondary Cell Group (SCG) and a Master Cell Group (MCG), respectively.

3. The method as claimed in claim 2, wherein the determining of whether the primary path is inapplicable comprises:
determining whether a failure of the SCG is detected; and
determining that the primary path is inapplicable in response to an SCG failure being detected.

4. The method as claimed in claim 2, wherein the determining of whether the primary path is inapplicable comprises:
determining whether a reestablishment of the MCG is detected;
determining whether a reconfiguration message not comprising a RadioBearerConfig Information Element (IE) for indicating Packet Data Convergence Protocol (PDCP) to delete an original split configuration is received in response to an MCG reestablishment being detected; and
determining that the primary path is inapplicable in response to receiving the reconfiguration message not comprising the RadioBearerConfig IE for indicating PDCP to delete the original split configuration.

5. The method as claimed in claim 2, wherein the MCG is formed by at least a 3rd Generation Partnership Project (3GPP) 4th Generation (4G) base station, while the SCG is formed by at least a 3GPP 5th Generation (5G) base station.

6. The method as claimed in claim 1, wherein the determining of whether the primary path is inapplicable comprises:
determining a first transmission delay on the primary path; and
determining that the primary path is inapplicable in response to the first transmission delay being greater than a first predetermined threshold.

7. The method as claimed in claim 6, wherein the switching from the primary path to the secondary path to continue the uplink transmissions is performed in response to a second transmission delay on the secondary path being less than the first predetermined threshold.

8. The method as claimed in claim 7, further comprising:
switching from the secondary path back to the primary path for continuing the uplink transmissions in response to second transmission delay being greater than the first transmission delay.

9. The method as claimed in claim 6, further comprising:
performing the uplink transmissions on both the primary path and the secondary path in response to the first transmission delay being less than the first predetermined threshold and greater than a second predetermined threshold which is less than the first predetermined threshold.

10. The method as claimed in claim 9, wherein the performing of the uplink transmissions on both the primary path and the secondary path comprises:
distributing uplink data between the primary path and the secondary path according to uplink grants reported by each Medium Access Control (MAC) entity.

11. A UE, supporting MR-DC with a first cell group and a second cell group in a mobile communication system, the UE comprising:
a first Radio Frequency (RF) device, configured to perform wireless transceiving to and from the first cell group;
a second RF device, configured to perform wireless transceiving to and from the second cell group; and
a controller, configured to
configure a primary path to the first cell group and a secondary path to the second cell group for uplink transmissions in an MR-DC operation,
determine an amount of uplink data being less than an uplink split threshold indicated by the mobile communication system,
determine whether the primary path is inapplicable when performing the uplink transmissions on the primary path via the first RF device, and
switch from the primary path to the secondary path to continue the uplink transmissions via the second RF device in response to the primary path being inapplicable, to avoid the UE always sending uplink data on the primary path.

12. The UE as claimed in claim 11, wherein the first cell group and the second cell group are a Secondary Cell Group (SCG) and a Master Cell Group (MCG), respectively.

13. The UE as claimed in claim 12, wherein the determining of whether the primary path is inapplicable comprises:
determining whether a failure of the SCG is detected; and
determining that the primary path is inapplicable in response to an SCG failure being detected.

14. The UE as claimed in claim 12, wherein the determining of whether the primary path is inapplicable comprises:
determining whether a reestablishment of the MCG is detected;
determining whether a reconfiguration message not comprising a RadioBearerConfig IE for indicating PDCP to delete the original split configuration is received in response to an MCG reestablishment being detected; and
determining that the primary path is inapplicable in response to receiving the reconfiguration message not comprising the RadioBearerConfig IE for indicating PDCP to delete the original split configuration.

15. The UE as claimed in claim 12, wherein the MCG is formed by at least a 3rd Generation Partnership Project (3GPP) 4th Generation (4G) base station, while the SCG is formed by at least a 3GPP 5th Generation (5G) base station.

16. The UE as claimed in claim 11, wherein the determining of whether the primary path is inapplicable comprises:
 determining a first transmission delay on the primary path; and
 determining that the primary path is inapplicable in response to the first transmission delay being greater than a first predetermined threshold.

17. The UE as claimed in claim 16, wherein the switching from the primary path to the secondary path to continue the uplink transmissions is performed in response to a second transmission delay on the secondary path being less than the first predetermined threshold.

18. The UE as claimed in claim 17, wherein the controller is further configured to switch from the secondary path back to the primary path for continuing the uplink transmissions in response to second transmission delay being greater than the first transmission delay.

19. The UE as claimed in claim 16, wherein the controller is further configured to perform the uplink transmissions on both the primary path and the secondary path via the first RF device and the second RF device in response to the first transmission delay being less than the first predetermined threshold and greater than a second predetermined threshold which is less than the first predetermined threshold.

20. The UE as claimed in claim 19, wherein the performing of the uplink transmissions on both the primary path and the secondary path comprises:
 distributing uplink data between the primary path and the secondary path according to uplink grants reported by each MAC entity.

* * * * *